US012562402B2

(12) United States Patent
Koiwa et al.

(10) Patent No.: US 12,562,402 B2
(45) Date of Patent: Feb. 24, 2026

(54) NONAQUEOUS ELECTROLYTE RECHARGEABLE BATTERY AND METHOD FOR MANUFACTURING NONAQUEOUS ELECTROLYTE RECHARGEABLE BATTERY

(71) Applicants: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Nobuaki Koiwa, Gamagori (JP); Shunya Maruyama, Toyohashi (JP); Takaaki Izumoto, Toyohashi (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 643 days.

(21) Appl. No.: 17/942,051

(22) Filed: Sep. 9, 2022

(65) Prior Publication Data

US 2023/0082774 A1 Mar. 16, 2023

(30) Foreign Application Priority Data

Sep. 13, 2021 (JP) ................................. 2021-148900

(51) Int. Cl.
*H01M 10/0587* (2010.01)
*H01M 10/0525* (2010.01)
(Continued)

(52) U.S. Cl.
CPC ... *H01M 10/0587* (2013.01); *H01M 10/0525* (2013.01); *H01M 50/103* (2021.01); *H01M 50/414* (2021.01)

(58) Field of Classification Search
CPC ...................... H01M 10/0587; H01M 10/0431
See application file for complete search history.

(56) References Cited

U.S. PATENT DOCUMENTS

| | | | | |
|---|---|---|---|---|
| 2006/0111625 A1* | 5/2006 | Yamauchi | ......... | H01M 10/0587 600/372 |
| 2009/0011337 A1* | 1/2009 | Kajita | ................. | H01M 50/449 429/324 |

(Continued)

FOREIGN PATENT DOCUMENTS

| | | | |
|---|---|---|---|
| JP | 2014-203583 A | | 10/2014 |
| JP | 2015053113 A | * | 3/2015 |

(Continued)

OTHER PUBLICATIONS

JP Office Action dated Jul. 18, 2023 as received in Application No. 2021-148900.

*Primary Examiner* — Maria Laios
*Assistant Examiner* — Benjamin T Lustgraaf
(74) *Attorney, Agent, or Firm* — Maschoff Brennan

(57) ABSTRACT

A lithium-ion rechargeable battery includes an electrode body rolled about a roll axis to be low-profile. In a cross section orthogonal to the roll axis, the electrode body includes a planar flat portion pressed to have a low profile and two semicircular rod-shaped bent portions bent and formed on opposite ends of the flat portion. Combined resistance of reaction resistance caused by an inter-electrode distance with solution resistance caused by air permeance of the separator in site, longitudinally extending from center to a peripheral surface of each bent portion, equals combined resistance of the reaction resistance with the solution resistance in site, extending from straight line to a peripheral surface of the flat portion in a thickness-wise direction, to (Continued)

obtain uniform resistance of the electrode body, thereby limiting deposition of lithium metal caused by non-uniform current density.

3 Claims, 6 Drawing Sheets

(51) Int. Cl.
  *H01M 50/103*       (2021.01)
  *H01M 50/414*       (2021.01)

(56)                References Cited

U.S. PATENT DOCUMENTS

| | | | |
|---|---|---|---|
| 2016/0254569 A1* | 9/2016 | Yagi ..................... | H01M 4/139 |
| | | | 429/94 |
| 2018/0062147 A1* | 3/2018 | Onoda ................ | H01M 50/264 |
| 2020/0106136 A1* | 4/2020 | Yogo ................. | H01M 10/0587 |

FOREIGN PATENT DOCUMENTS

| | | | |
|---|---|---|---|
| JP | 2016-181409 A | 10/2016 |
| JP | 2018-032575 A | 3/2018 |
| JP | 2019-175655 A | 10/2019 |
| JP | 2020-057458 A | 4/2020 |

* cited by examiner

| Step | D/B Ratio | B-Section/D-Section Air Permeance Ratio | B′ (B″)/2E Ratio |
|---|---|---|---|
| Rolling | − | 1.00 | 1.00 |
| Low-Profile Pressing | 1.03~1.25 | 0.90~0.99 | 0.88~0.98 |
| Restoring | 1.01~1.10 | 0.90~0.99 | 0.98~1.00 |

Fig.9

| D/B Ratio | B-Section/D-Section Air Permeance Ratio | B'/2E Ratio | Li Deposition |
|-----------|------------------------------------------|-------------|---------------|
| 1.00 | 0.95 | 0.99 | ✕ |
| 1.01 | 0.95 | 0.99 | ◯ |
| 1.05 | 0.95 | 0.99 | ◯ |
| 1.08 | 0.95 | 0.99 | ◯ |
| 1.10 | 0.95 | 0.99 | ◯ |
| 1.11 | 0.95 | 0.99 | ✕ |

Fig.10

| D/B Ratio | B-Section/D-Section Air Permeance Ratio | B'/2E Ratio | Li Deposition |
|-----------|------------------------------------------|-------------|---------------|
| 1.05 | 0.88 | 0.99 | ✕ |
| 1.05 | 0.90 | 0.99 | ◯ |
| 1.05 | 0.99 | 0.99 | ◯ |
| 1.05 | 1.00 | 0.99 | ✕ |

Fig.11

| D/B Ratio | B-Section/D-Section Air Permeance Ratio | B'/2E Ratio | Li Deposition |
|-----------|------------------------------------------|-------------|---------------|
| 1.05 | 0.95 | 0.97 | ✕ |
| 1.05 | 0.95 | 0.98 | ◯ |
| 1.05 | 0.95 | 1.00 | ◯ |
| 1.05 | 0.95 | 1.01 | ✕ |

NONAQUEOUS ELECTROLYTE RECHARGEABLE BATTERY AND METHOD FOR MANUFACTURING NONAQUEOUS ELECTROLYTE RECHARGEABLE BATTERY

BACKGROUND

1. Field

The following description relates to a nonaqueous electrolyte rechargeable battery and a method for manufacturing a nonaqueous electrolyte rechargeable battery, and more specifically, a nonaqueous electrolyte rechargeable battery and a method for manufacturing a nonaqueous electrolyte rechargeable battery that limit metal deposition.

2. Description of Related Art

A nonaqueous electrolyte rechargeable battery such as a lithium-ion rechargeable battery has been recently used as a power supply of an electric vehicle. Hence, the lithium-ion rechargeable battery includes a number of cell batteries connected in series or in parallel to supply a high voltage or a high current. Rolled-type batteries, in which electrode sheets are rolled, are used in the cell batteries so as to be compact when loaded. Further, cell batteries having a low-profile rolled electrode body are often used so that the cooling efficiency is improved and the electrode sheets are disposed closer to each other.

The low-profile electrode body includes a flat portion, which has been flattened by a pressing step, and a bent portion, which is folded at each end of the flat portion. In such an electrode body, the differences in structure between the flat portion and the bent portion cause various problems.

Japanese Laid-Open Patent Publication No. 2020-57458 discloses an example of a nonaqueous electrolyte rechargeable battery having the following structure. A negative composite material layer has a first region located in a flat portion of the electrode body and a second region located in two bent portions. The ratio (B/A) of the packing density (B) of the second region to the packing density (A) of the first region is greater than or equal to 0.75 and less than or equal to 0.95. In a cross section that is orthogonal to an axial direction of the electrode body and extends through an axial central part of the electrode body, the ratio (SB/SA) of the cross-sectional area (SB) of the two bent portions to the cross-sectional area (SA) of the flat portion is greater than or equal to 0.28 and less than or equal to 0.32.

This structure obtains a high capacity maintenance rate and produces a high output while limiting lithium deposition on a negative electrode surface.

Japanese Laid-Open Patent Publication No. 2018-32575 discloses an example in which in a cross section of a rolled electrode body, the thickness from the inner bent end V to the outer bent end P is referred to as center thickness D of a bent R-portion. The thickness from the inner bent end V to the peripheral surface S of the rolled electrode body along the R-portion/F-portion boundary W is referred to as boundary thickness B of the bent R-portion. The ratio of D to B (D/B) is greater than or equal to 1.01 and less than or equal to 1.07.

This structure obtains a high capacity maintenance rate and limits increases in resistance and thus is highly durable.

However, nonuniformity of current density in the electrode body is not resolved by merely changing the densities of the flat portion and the bent portions as described in Japanese Laid-Open Patent Publication No. 2020-57458 or changing the thickness of the flat portion and the bent portions as described in Japanese Laid-Open Patent Publication No. 2018-32575. As a result, deposition of lithium metal or the like is not sufficiently limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is a method for manufacturing a nonaqueous electrolyte rechargeable battery that includes an electrode body, a nonaqueous electrolyte, and a rectangular box-shaped battery case accommodating the electrode body and the nonaqueous electrolyte. The method includes laminating a positive electrode including a positive base and a positive composite material layer and a negative electrode including a negative base and a negative composite material layer with a porous resin separator disposed between the positive electrode and the negative electrode to form the electrode body, rolling the laminated electrode body about a roll axis, low-profile pressing the electrode body, which was rolled in the rolling, from a direction orthogonal to the roll axis to form a planar flat portion F and two semicircular rod-shaped bent portions R on opposite ends of the flat portion F, and restoring the electrode body from elastic deformation occurred in the low-profile pressing. When a direction parallel to the roll axis of the electrode body is referred to as a width-wise direction, a direction orthogonal to the roll axis of the electrode body and a surface of the flat portion F is referred to as a thickness-wise direction, a direction orthogonal to the width-wise direction and the thickness-wise direction is referred to as a longitudinal direction, a point located on a center axis of the semicircular rod-shaped bent portions R is referred to as a center C of the bent portions R, a site extending from the center C of each bent portion R to a peripheral surface of the bent portion R in the longitudinal direction upon completion of the restoring is referred to as a site D, the centers C of the two bent portion R are connected by a straight line, and a site extending from the straight line to a peripheral surface of the flat portion F in the thickness-wise direction upon completion of the restoring is referred to as a site B, a distance from one peripheral surface of the flat portion F to the other peripheral surface in the thickness-wise direction of the electrode body upon completion of the restoring is referred to as a thickness-wise dimension B', a lamination thickness of the electrode body upon completion of the rolling is referred to as an electrode body lamination thickness E, and a distance from one peripheral surface of the flat portion F to the other peripheral surface in the thickness-wise direction of the electrode body upon completion of the low-profile pressing is referred to as a thickness-wise dimension B", a thickness of the site D/a thickness of the site B, an air permeance of the site D/an air permeance of the site B, the thickness-wise dimension B'/(2×the electrode body lamination thickness E), and the thickness-wise dimension B'/the thickness-wise dimension B" are each adjusted within a predetermined range.

Another aspect of the present disclosure is a nonaqueous electrolyte rechargeable battery that includes an electrode body, a nonaqueous electrolyte, and a rectangular box-shaped battery case accommodating the electrode body and the nonaqueous electrolyte. The electrode body includes a positive electrode including a positive base and a positive composite material layer, a negative electrode including a negative base and a negative composite material layer, and a porous resin separator disposed between the positive electrode and the negative electrode. The positive electrode, the negative electrode, and the separator are laminated, rolled about a roll axis, and shaped to have a low profile. In a cross section of the electrode body orthogonal to the roll axis, the electrode body includes a planar flat portion F that is pressed to be flat and two semicircular rod-shaped bent portions R that are bent and located on opposite ends of the flat portion F. When a direction parallel to the roll axis of the electrode body is referred to as a width-wise direction, a direction orthogonal to the roll axis of the electrode body and a surface of the flat portion Fis referred to as a thickness-wise direction, a direction orthogonal to the width-wise direction and the thickness-wise direction is referred to as a longitudinal direction, a point located on a center axis of the semicircular rod-shaped bent portions R is referred to as a center C of the bent portions R, a site extending from the center C of each bent portion R to a peripheral surface of the bent portion R in the longitudinal direction is referred to as a site D, the centers C of the two bent portion R are connected by a straight line, and a site extending from the straight line to the peripheral surface of the flat portion F in the thickness-wise direction is referred to as a site B, a combined resistance $Rdc$ of a reaction resistance $Rd1$ caused by an inter-electrode distance with a solution resistance $Rd2$ caused by the air permeance of the separator in the site D is set to be equal to a combined resistance $Rbc$ of a reaction resistance $Rb1$ caused by an inter-electrode distance with a solution resistance $Rb2$ caused by the air permeance of the separator in the site B.

Other features and aspects will be apparent from the following detailed description, the drawings, and the claims.

BRIEF DESCRIPTION OF THE DRAWINGS

FIG. 9 is a table showing the results of a first experiment.

FIG. 10 is a table showing the results of a second experiment.

FIG. 11 is a table showing the results of a third experiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A method for manufacturing a nonaqueous electrolyte rechargeable battery according to the present disclosure will now be described using the lithium-ion rechargeable battery 1 as an example with reference to FIGS. 1 to 11.

Overview of Present Embodiment

Principle of Present Embodiment

Figure 4:
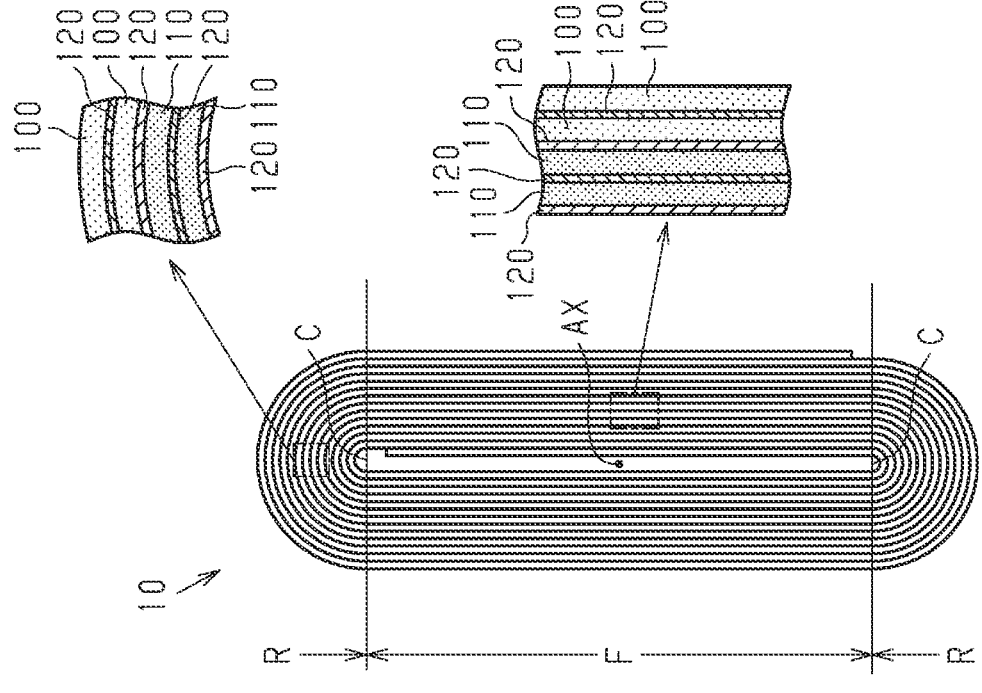
FIG. 4 is a schematic diagram showing a flat portion F and bent portions R as viewed in the width-wise direction W.

In the present embodiment, deposition of lithium metal is effectively limited in the lithium-ion rechargeable battery. In the lithium-ion rechargeable battery 1, a cause of lithium deposition is nonuniformity of the current density between a positive electrode sheet 110 and a negative electrode sheet 100 in the electrode body 10, which is shown in FIG. 4. As described above, a rolled-type battery including rolled electrode sheets is used in the lithium-ion rechargeable battery 1 for vehicle on-board use. Further, a cell battery having a low-profile rolled electrode body is often used to reduce battery size and increase the cooling efficiency.

Such a low-profile electrode body includes a flat portion F, which has been flattened by a low-profile pressing step, and a bent portion R, which is folded at each end of the flat portion F. In such an electrode body, the differences in structure between the flat portion F and the bent portion R cause the flat portion F and the bent portion R to have different resistance values. Consequently, the current density tends to be nonuniform.

However, deposition of lithium metal or the like is not sufficiently limited by merely changing the densities of the flat portion F and the bent portion R as described in Japanese Laid-Open Patent Publication No. 2020-57458 or changing the thickness of the flat portion F and the bent portion R as described in Japanese Laid-Open Patent Publication No. 2018-32575. In the present disclosure, the combined resistance of the flat portion F and the combined resistance of the bent portion R are set to be uniform.

According to analysis of the present disclosure, a reaction resistance is one of the factors that determine the combined resistance of the flat portion F and the combined resistance of the bent portion R. The reaction resistance varies depending on a distance between electrodes. In the low-profile pressing step, the inter-electrode distance in the flat portion F becomes shorter than the inter-electrode distance in the bent portion R. As a result, the reaction resistance caused by the inter-electrode distance in the flat portion F is reduced. In the low-profile rolled-type lithium-ion rechargeable battery 1, it is difficult to decrease the difference between the reaction resistances to zero in the low-profile pressing step. Moreover, even if the reaction resistances depending on the inter-electrode distance become equal to each other, the combined resistance of the negative electrode sheet 100 and the positive electrode sheet 110 does not become zero.

Another one of the factors that determine the combined resistance of the flat portion F and the combined resistance of the bent portion R is a solution resistance. The solution resistance is affected by the air permeance of a separator 120 even when the electrolytic solution is the same. The separator 120 is a porous resin sheet having fine holes. The resistance between the electrodes changes in accordance with the diameter of the holes. The solution resistance increases as the air permeance decreases. The solution resistance decreases as the air permeance increases. However, since the low-profile rolled-type electrode body 10 uses a continuous belt-shaped separator 120, it is difficult for the flat portion F and the bent portion R to have different air permeances.

The inventors of the present disclosure have developed a configuration that uses a belt-shaped separator 120 of a uniform material and changes the air permeances of the flat portion F and the bent portion R to adjust the solution resistances, thereby equalizing the combined resistance of the flat portion F and the combined resistance of the bent portion R.

More specifically, the inventors found that once the separator 120 is pressed, the air permeance is changed even after the separator 120 is restored to its former thickness. Thus, the inventors found a method for manufacturing the lithium-ion rechargeable battery 1 in which the flat portion F and the bent portion R have different air permeances.

Basic Structure of Lithium-Ion Rechargeable Battery 1

The structure of the lithium-ion rechargeable battery 1 described in the present embodiment will now be briefly described.

Figures 1, 2:
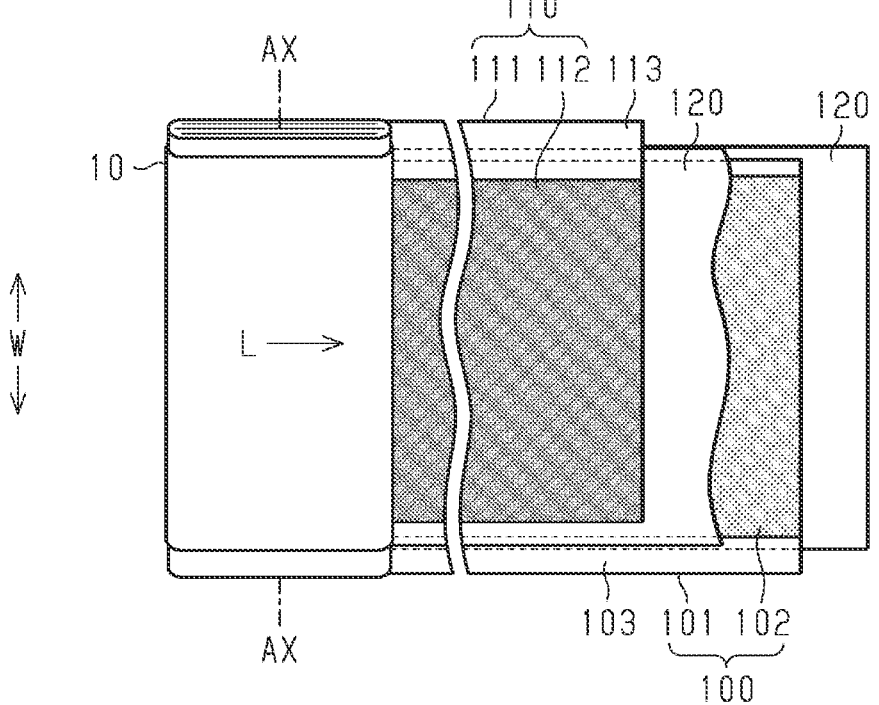
FIG. 1 is a perspective view of a lithium-ion rechargeable battery 1.
FIG. 2 is a schematic diagram showing the structure of a lamination of an electrode body 10 of the lithium-ion rechargeable battery 1.

FIG. 1 is a perspective view of the lithium-ion rechargeable battery 1. As shown in FIG. 1, the lithium-ion rechargeable battery 1 includes a cell battery. The lithium-ion rechargeable battery 1 includes a rectangular-box-shaped battery case 11 having an upper opening. The battery case 11 includes a lid 12 configured to seal the battery case 11. The electrode body 10 is accommodated in the battery case 11. A nonaqueous electrolyte 17 is added into the battery case 11 from a liquid inlet, which is not shown in the drawings. The battery case 11 and the lid 12 are formed from metal such as an aluminum alloy. In the lithium-ion rechargeable battery, when the lid 12 is attached to the battery case 11, a hermetic battery container is formed. The lithium-ion rechargeable battery further includes a negative external terminal 14 and a positive external terminal 16 that are disposed on the lid 12 and used to charge and discharge power.

Electrode Body 10

FIG. 2 is a schematic diagram showing the structure of a lamination of the electrode body 10 of the lithium-ion rechargeable battery 1. As shown in FIG. 2, the electrode body 10 of the lithium-ion rechargeable battery 1 includes the negative electrode sheet 100, the positive electrode sheet 110, and the separator 120. The negative electrode sheet 100 includes a negative base 101 and negative composite material layers 102 disposed on opposite ends of the negative base 101. The positive electrode sheet 110 includes a positive base 111 and positive composite material layers 112 disposed on opposite ends of the positive base 111. The negative electrode sheet 100 and the positive electrode sheet 110 are disposed on opposite sides of the separator 120 to form a lamination. The lamination is rolled about a roll axis in a longitudinal direction and then is shaped to have a low profile. This forms the electrode body 10.

A negative connector 103 is used as a current collector that draws out electricity from the negative composite material layers 102 of the negative electrode sheet 100. A positive connector 113 is used as a current collector that draws out electricity from the positive composite material layers 112 of the positive electrode sheet 110.

End Structure of Electrode Body 10

Figure 3:
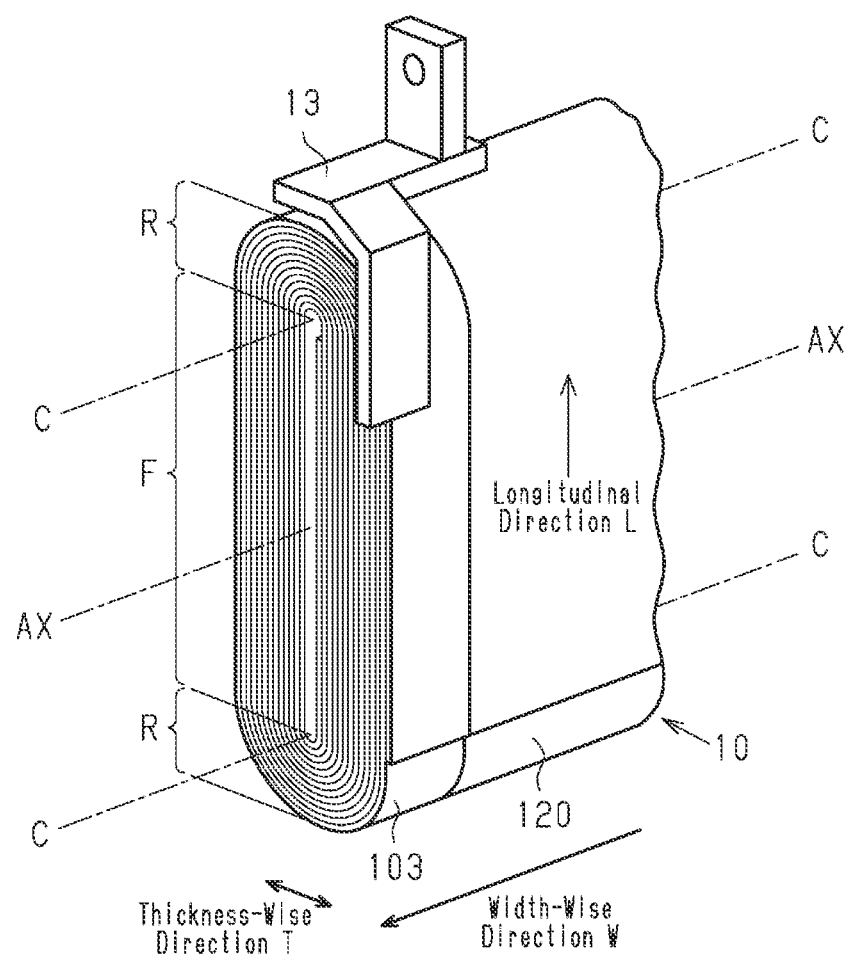
FIG. 3 is a perspective view of a negative electrode end of the rolled electrode body 10 in a width-wise direction.

FIG. 3 is a perspective view of the negative electrode end of the rolled electrode body 10 in the width-wise direction. Portions of the electrode body 10 located on centers C-C are supported, the electrode body 10 is rolled about a roll axis AX (FIG. 6: S3). In the low-profile pressing step (FIG. 6: S4), the electrode body 10 is pressed by two pressing units 2 (refer to FIG. 7B) from a thickness-wise direction T that is orthogonal to a width-wise direction W so that as viewed in the width-wise direction W, the end has a low profile, for example, the form of an athletic track. As shown in FIG. 1, the low-profile electrode body 10 is accommodated in the battery case 11. As shown in FIGS. 1 and 2, a negative current collector 13 is welded to the negative connector 103. Also, a positive current collector 15 is welded to the positive connector 113. Examples of the method for welding a current collector to a connector include ultrasonic welding, resistance welding, and electric welding. The negative external terminal 14 is connected to the negative current collector 13 through the lid 12. The positive external terminal 16 is connected to the positive current collector 15 through the lid 12.

In this description, a direction parallel to the roll axis AX of the electrode body 10 is referred to as the width-wise direction W. Also, a direction that is orthogonal to the roll axis AX of the electrode body 10 and a surface of the flat portion F is referred to as the thickness-wise direction T. A direction that is orthogonal to the width-wise direction W and the thickness-wise direction T is referred to as the longitudinal direction L.

Flat Portion F and Bent Portion R

FIG. 4 is a schematic diagram showing the flat portion F and the bent portions R of the electrode body 10 as viewed in the width-wise direction W. The electrode body 10, which is pressed and has a low profile, includes a linear center portion defining the flat portion F that is planar and formed of the negative electrode sheet 100, the positive electrode sheet 110, and the separator 120.

At an upper end and a lower end of the flat portion F, the electrode body 10, which is formed by laminating the negative electrode sheet 100, the positive electrode sheet 110, and the separator 120, is bent into the form of a semicircular rod to form the bent portion R.

The bent portions R have the form of semicircles that are substantially concentric as viewed in the width-wise direction W. The negative electrode sheet 100, the positive electrode sheet 110, and the separator 120 that are laminated in the bent portions R are semicircular and substantially concentric as viewed in the width-wise direction W. The position of the center of each semicircle is referred to as the center C. The center C may be considered as a straight line extending in the width-wise direction W. Also, the center C may be considered as a midpoint between borderlines of the flat portion F and each bent portion R in the longitudinal direction L.

Dimensions of Electrode Body 10

Figure 5:
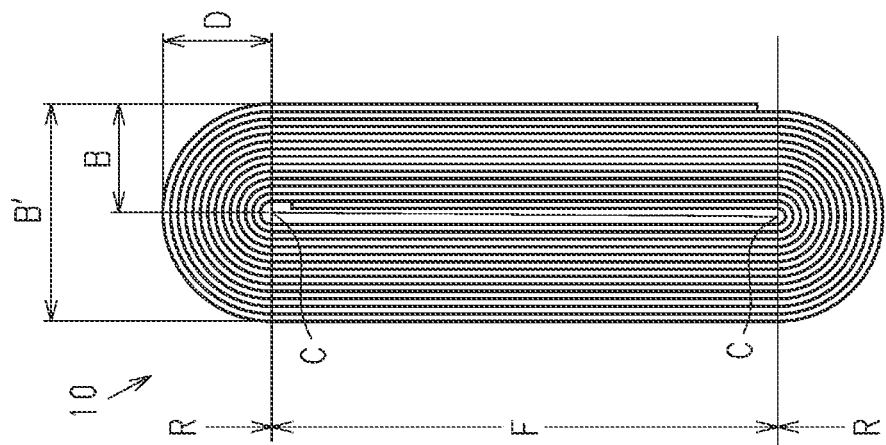
FIG. 5 is a diagram showing the location of each dimension of the electrode body 10 as viewed in the width-wise direction W.

FIG. 5 is a diagram showing the location of each dimension of the electrode body 10 as viewed in the width-wise direction W. As shown in FIG. 5, the site extending from the center C of the bent portion R to the peripheral surface of the bent portion R in the longitudinal direction L upon completion of the restoring step (refer to FIG. 7: S5) is referred to as the site D.

The centers C of the two bent portions R are connected by a straight line, and the site extending from the straight line to the peripheral surface of the flat portion F in the thickness-wise direction T upon completion of the restoring step (S5) is referred to as the site B. The restoring step (S5), which will be described later in detail, corresponds to a state in which the electrode body 10 is deformed in the low-profile-pressing step (S4) and then restored by rebound resilience from the deformation, so that the dimensions of the electrode body 10 are stabilized as a product.

The distance from one peripheral surface of the flat portion F to the other peripheral surface in the thickness-wise direction T of the electrode body 10 upon completion of the restoring step (S5) is referred to as the thickness-wise dimension B'. That is, the thickness-wise dimension B' is substantially twice longer than the site B.

Figures 7A, 7B, 7C, 8:
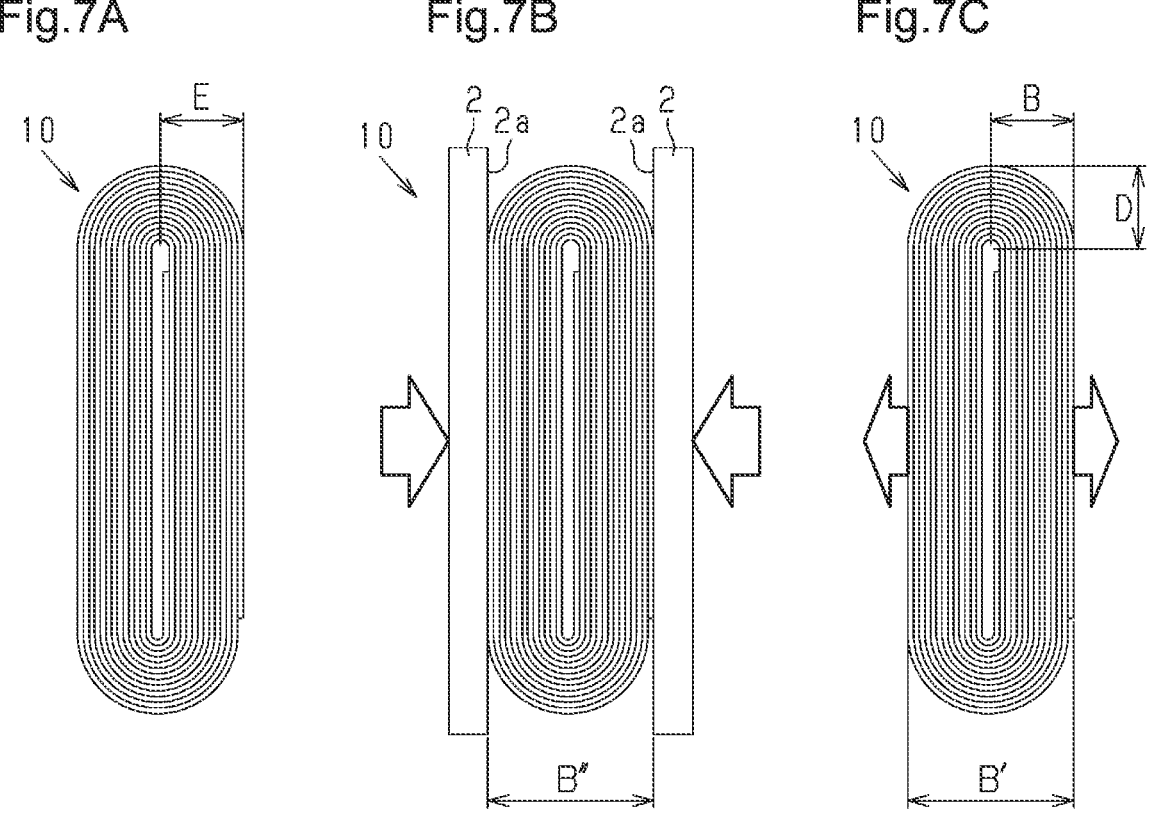
FIG. 7A is a diagram showing the electrode body upon completion of the rolling step (S3)
FIG. 7B is a diagram showing the electrode body during the low-profile pressing step (S4)
FIG. 7C is a diagram showing the electrode body during the restoring step (S5).
FIG. 8 is a table showing the D/B ratio, the air permeance ratio of the B-section (site B) to the D-section (site D), and the ratio of B'(B") to (2×electrode body lamination thickness E) upon completion of the rolling step (S3), immediately after the low-profile pressing step (S4), and during the restoring step (S5).

The thickness of the electrode body 10 upon completion of the rolling step (S3), that is, the thickness of the lamination of the electrode body 10 (lamination thickness) upon completion of the rolling step (S3), is referred to as the electrode body lamination thickness E (refer to FIG. 7A). The laminating step (S2), which will be described later in detail, refers to a step of laminating the negative electrode sheet 100 and the positive electrode sheet 110 with the separator 120 disposed between the negative electrode sheet 100 and the positive electrode sheet 110. The rolling step (S3) refers to a step of supporting the negative electrode sheet 100, the positive electrode sheet 110, and the separator 120 that are belt-shaped and laminated (lamination) by the centers C-C, rolling the lamination about the roll axis AX, and further laminating in a loop. The thickness upon completion of the rolling step (S3) is the original thickness of the negative electrode sheet 100, the positive electrode sheet 110, and the separator 120 prior to the low-profile pressing step (S4), that is, when pressure is not applied. More specifically, the thickness of the lamination of the negative electrode sheet 100, the positive electrode sheet 110, and the separator 120 upon completion of the rolling step (S3) is the original thickness of the negative electrode sheet 100, the positive electrode sheet 110, and the separator 120 prior to the low-profile pressing step (S4), that is, when pressure is not applied.

The distance from one peripheral surface of the flat portion F to the other peripheral surface in the thickness-wise direction of the electrode body 10 upon completion of the low-profile pressing step (S4) is referred to as the thickness-wise dimension B" (refer to FIG. 7B).

Negative Electrode Sheet 100

The negative composite material layers 102 are formed on opposite surfaces of the negative base 101 to obtain the negative electrode sheet 100. In the embodiment, the negative base 101 is formed of a copper foil. The negative base 101 is a base for aggregating negative composite material layers 102 and is also a current collecting member that collects electricity from the negative composite material layers 102. The negative electrode sheet 100 is obtained by forming the negative composite material layers 102 on the metal negative base 101. In the first embodiment, the negative active material is a material capable of storing and releasing lithium ions and is powder of a carbon material such as graphite.

The negative electrode sheet 100 is formed by, for example, mixing the negative active material, solvent, and binder, applying the mixed negative composite material to the negative base 101, and drying the negative composite material.

Positive Electrode Sheet 110

The positive composite material layers 112 are formed on opposite surfaces of the positive base 111 to obtain the positive electrode sheet 110. In the embodiment, the positive base 111 is formed of an aluminum foil or an aluminum-alloy foil. The positive base 111 is a base for aggregating positive composite material layers 112 and is also a current collecting member that collects electricity from the positive composite material layers 112.

In the positive electrode sheet 110, the positive composite material layers 112 are formed on surfaces of the positive base 111. The positive composite material layers 112 include a positive active material. The positive active material is a material capable of storing and releasing lithium and is, for example, lithium cobalt oxide ($LiCoO_2$), lithium manganese oxide ($LiMn_2O_4$), or lithium nickel oxide ($LiNiO_2$). Further, $LiCoO_2$, $LiMn_2O_4$, and $LiNiO_2$ may be mixed in any proportion.

The positive composite material layers 112 include a conductive material. Examples of the conductive material include acetylene black (AB), carbon black such as Ketjen-black (registered trademark), and graphite.

The positive electrode sheet 110 is formed by, for example, mixing the positive active material, the conductive member, solvent, and binder, applying the mixed positive composite material to the positive base 111, and drying the positive composite material.

Separator 120

The separator 120 is a non-woven cloth of polypropylene or the like that retains the nonaqueous electrolyte 17 between the negative electrode sheet 100 and the positive electrode sheet 110. As the separator 120, a porous polymer film such as a porous polyethylene film, a porous polyolefin film, or a porous polyvinyl chloride film and a lithium-ion-conductive or ion-conductive polymer electrolyte membrane may be used alone or combined. When the electrode body 10 is immersed into the nonaqueous electrolyte 17, the non-aqueous electrolyte permeates the separator 120 from the ends toward the center.

Mechanical Property of Separator 120

The separator 120 entirely has a porous structure. The mechanical structure of the separator 120 has a relatively thick framework and a relatively thin three-dimensional mesh portion formed on the framework. In the low-profile pressing step (S4), when the separator 120 is compressed, since the resin of the separator 120 is elastic, the separator 120 is elastically deformed so that void portions in the separator 120 are compressed. At this time, the relatively thin three-dimensional mesh portion, which is formed in the relatively thick framework, deforms more greatly than the framework even when receiving the same force. When the compressed state is shifted to an uncontrolled state in which no pressure is applied, the thickness of the entire separator 120 is restored almost completely by the resilience. The relatively thin three-dimensional mesh portion, which is deformed more greatly, has a plastically deformed portion that is deformed beyond the yield point. In contrast, the relatively thick framework is less likely to be plastically deformed and is restored to the original shape almost completely by the resilience.

Air Permeance [μm/(Pa·s)] of Separator 120

The air permeance is a numerical value that indicates the relative ease of air to pass through paper, a non-woven cloth, or a filter. The air permeance is measured by an experiment using a Gurley air permeance tester complying with "JIS P 8117 (Paper and board-Determination of air permeance and air permeance)" in a Gurley method. The Gurley tester method is applied to papers or boards having an ISO air permeance of 0.1 μm/(Pa·s) to 100 μm/(Pa·s) or an air resistance of 1.4 s to 1300 s. Air is compressed by the vertical weight of an inner cylinder floating in a liquid. As the air passes through a test specimen, the inner cylinder gradually lowers. The time taken for a certain volume of air to pass through the test specimen is measured, and the ISO air permeance is calculated from the measured value.

In the Gurley tester method, the number of seconds taken for a specific volume of air to pass through a specific area of paper when a specific pressure difference exists is referred to as Gurley seconds and is referred to as the air permeance. Although the JIS terminology is "air resistance", the conventional term "air permeance" is used in this description. Alternatively, the measurement may be conducted by the Oken type tester method instead of the Gurley tester method.

The relatively thin three-dimensional mesh portion, which is present in the separator 120 before the low-profile pressing step (S4), is deformed beyond the yield point and results in plastic deformation after the low-profile pressing step (S4). The diameter of each void portion is decreased from that before the low-profile pressing step (S4). That is, the air permeance of the separator 120 changes between before and after the low-profile pressing step (S4). As described above, the entire dimension of the separator 120 subtly differs between before and after the low-profile pressing step (S4) due to the resilience of the framework. However, even though the entire dimension is restored, the air permeance of the separator 120 is decreased in accordance with the compressed and diminished void portions in the separator 120. That is, exchange of the nonaqueous electrolyte 17 is limited.

Thus, the solution resistance is controlled by controlling the air permeance of the separator 120.

Nonaqueous Electrolyte 17

A nonaqueous electrolyte is a composition in which a nonaqueous solvent contains a supporting salt. For example, ethylene carbonate (EC) may be used as the nonaqueous solvent. Alternatively, the nonaqueous solvent may be one or more materials selected from a group of propylene carbonate (PC), diethyl carbonate (DEC), dimethyl carbonate (DMC), ethyl methyl carbonate (EMC), and the like. The supporting salt may be, for example, $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, or LiI. Moreover, the supporting salt may be one or more types of lithium compound (lithium salt) selected from the above compounds.

Steps for Manufacturing Lithium-Ion Rechargeable Battery 1

Figure 6:
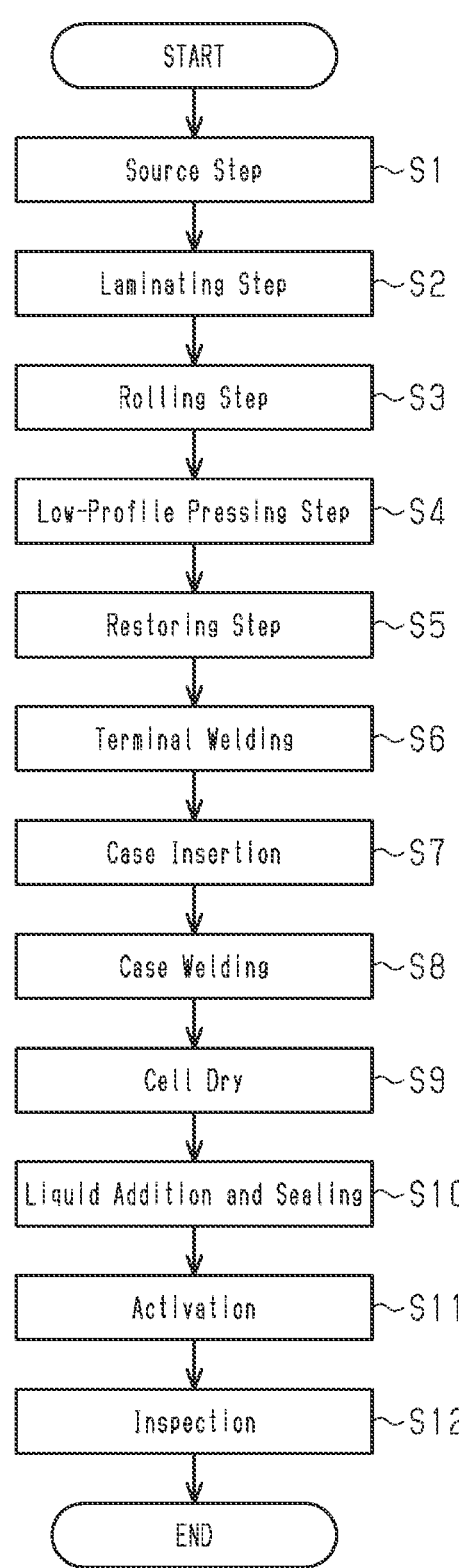
FIG. 6 is a flowchart showing steps for manufacturing the lithium-ion rechargeable battery 1 in the present embodiment.

FIG. 6 is a flowchart showing steps for manufacturing the lithium-ion rechargeable battery 1 in the present embodiment. The overview of the manufacturing steps of the lithium-ion rechargeable battery in the present embodiment will now be described with reference to FIG. 6.

Source Step (S1)

In the present embodiment, the source step (S1) is first executed. The source step refers to a step for producing battery elements of a lithium-ion rechargeable battery. More specifically, the step is for forming each of the negative electrode sheet 100, the positive electrode sheet 110, and the separator 120, which are included in the battery elements of the lithium-ion rechargeable battery.

Laminating Step (S2)

After the negative electrode sheet 100, the positive electrode sheet 110, and the separator 120 are formed in the source step (S1), the laminating step (S2) is executed.

As shown in FIG. 2, in the laminating step, the negative electrode sheet 100, the separator 120, the positive electrode sheet 110, and the separator 120 are laminated in order. The negative composite material layers 102 and the positive composite material layers 112 are disposed to be opposed to each other at opposite sides of the separator 120. The negative connector 103 is disposed to project from the separator 120 at one end in the width-wise direction W. The positive connector 113 is disposed to project from the separator 120 at the other end in the width-wise direction W.

Rolling Step (S3)

The rolling step (S3) is executed on the electrode body 10 in which the negative electrode sheet 100, the separator 120, the positive electrode sheet 110, and the separator 120 are laminated in order in the laminating step (S2). In the rolling step (S3), the portions of the laminated electrode body 10 located on the center C-C are supported by a core and are rolled about the roll axis AX, which extends in the width-wise direction W.

FIG. 7A is a diagram showing the electrode body 10 upon completion of the rolling step (S3). As shown in FIG. 7A, the rolled electrode body 10 includes the flat portion F, which is shaped as an athletic track, and the bent portions R, which are disposed at opposite ends of the flat portion F.

Low-Profile Pressing Step (S4)

FIG. 7B is a diagram showing the electrode body 10 during the low-profile pressing step (S4). As shown in FIG. 7B, in the rolling step (S3), the electrode body 10 is rolled so that the flat portion F and the bent portions R, located at opposite ends of the flat portion F, are formed as viewed in the width-wise direction W. In the electrode body 10, the flat portion F is sandwiched and compressed in the thickness-wise direction T by the pressing units 2, which include two pressing surfaces 2a that are flat and opposed to each other. On the other hand, generally, the bent portion R subtly deforms in the low-profile pressing step (S4).

Restoring Step (S5)

FIG. 7C is a diagram showing the electrode body 10 during the restoring step (S5). In the restoring step (S5), the electrode body 10, which was pressed by the pressing units 2 in the low-profile pressing step (S4), is substantially restored to its former shape by the rebound resilience. In the restoring step (S5), no active process is executed, and the electrode body 10 is just left in an uncontrolled state. The uncontrolled time varies depending on the material and structure. In the present embodiment, the uncontrolled time is approximately a few seconds.

Terminal Welding (S6)

As shown in FIG. 2, in the electrode body 10 that is shaped in the low-profile pressing step (S4), the negative base 101 is exposed from one end to form the negative connector 103, and the positive base 111 is exposed from the other end to form the positive connector 113.

As shown in FIG. 3, in the terminal welding (S6), the negative current collector 13 is welded to the negative connector 103 and electrically and mechanically connected to the negative connector 103.

Also, as shown in FIG. 1, the positive current collector 15 is welded to the positive connector 113 and electrically and mechanically connected to the positive connector 113.

Case Insertion (S7)

As shown in FIG. 1, in the step of the case insertion (S7), the electrode body 10, which has been rolled and has a low profile, and the positive current collector 15 and the negative current collector 13, which are welded to the electrode body 10, are inserted into the battery case 11.

Case Welding (S8)

In the step of the case welding (S8), the battery case 11 is sealed with the lid 12 by laser beam welding or the like. At this stage, the nonaqueous electrolyte is not added, and the liquid inlet of the lid 12 is open.

Cell Dry (S9)

In the step of the cell dry (S9), for example, moisture and the like present in the battery case is heated and sufficiently dried.

Liquid Addition and Sealing (S10)

In the step of the liquid addition and sealing (S10), the nonaqueous electrolyte 17 is added from the liquid inlet. When the liquid addition is completed, the liquid inlet is sealed. This completes the assembly of the cell battery.

Activation (S11)

When the assembly of the cell battery is completed, the step of the activation (S11) is executed in order to form a solid electrolyte interphase (SEI) coating. In this step, for example, initial charging and aging are executed to stabilize and activate the cell battery.

Inspection (S12)

In the step of the inspection (S12), for example, cell voltage, battery internal resistance, and self-discharging of the cell battery are inspected. When the cell battery demonstrates predetermined properties, the cell battery is served as a product. Around six to twelve cell batteries of vehicle on-board lithium-ion rechargeable batteries that have passed the inspection are stacked to form a battery module. A plurality of battery modules is accommodated in a container and provided with a controller and various sensors to form a battery pack for use with a vehicle.

Controlling Dimensions and Air Permeance of Electrode Body 10

The control of the dimensions and the air permeance of the electrode body 10 during the manufacturing of the lithium-ion rechargeable battery 1 will now be described.

In the present embodiment, the dimensions are controlled by changing the air permeances of the flat portion F and the bent portion R to adjust the solution resistances, thereby equalizing the combined resistance of the flat portion F and the combined resistance of the bent portion R.

FIG. 8 is a table showing the D/B ratio, the air permeance ratio of the B-section to the D-section, and the ratio of B' to (2×electrode body lamination thickness E) upon completion of the rolling step (S3), immediately after the low-profile pressing step (S4), and upon completion of the restoring step (S5).

Adjustment After Rolling Step (S3)

As shown in FIG. 7A, the electrode body lamination thickness E refers to the thickness of the electrode body 10, upon completion of the rolling step (S3), from the straight line, which connects the centers C of the two bent portions R, to the peripheral surface of the flat portion F in the thickness direction T. At this stage, the separator 120 has not received compressing force from a pressing machine or the like and thus maintains the original thickness from when manufactured. The flat portion F and the bent portions R have a fixed thickness. Also, the porous structure of the separator 120 maintains the original voids from when manufactured and maintains the original air permeance. Therefore, the ratio of B' to (2×the electrode body lamination thickness E) is 1.00.

In addition, the air permeance [μm/(Pa·s)] is constant in the flat portion F and the bent portions R because the separator 120 maintains the original structure from when manufactured. Therefore, the air permeance ratio of the B-section (site B) to the D-section (site D) is 1.00.

Dimensions Immediately after Completion of Low-Profile Pressing Step (S4)

As shown in FIG. 7B, in the low-profile pressing step (S4), the electrode body 10 is compressed by the opposing pressing surfaces 2a of the pressing units 2. The distance from one peripheral surface of the flat portion F to the other peripheral surface in the thickness-wise direction T of the electrode body 10 is referred to as the thickness-wise dimension B''. In this state, the electrode body 10 is compressed, so that the thickness is decreased from the original thickness, that is, (2×electrode body lamination thickness E), to the thickness-wise dimension B''. More specifically, the ratio of B'' to (2×electrode body lamination thickness E) is decreased to 0.88 to 0.98.

In contrast, the site D, which extends from the center C of the bent portion R to the peripheral surface of the bent portion R in the longitudinal direction, is not compressed. Thus, as shown in FIG. 8, the D/B ratio is 1.03 to 1.25.

The compressed dimensions of the electrode body 10, which was compressed in the low-profile pressing step (S4), change in the subsequent restoring step (S5). The thickness-wise dimension B'' obtained in the low-profile pressing step (S4) is not important as its value but is important for its consequent effect on the air permeance [μm/(Pa·s)]. More specifically, in the low-profile pressing step (S4), the walls of the fine holes are compressed beyond the yield point, and the separator 120 is plastically deformed. As a result, the air permeance [μm/(Pa·s)] is decreased. The air permeance of the site B is controlled by controlling the thickness-wise dimension B''. More specifically, as shown in FIG. 8, the air permeance ratio of the B-section (site B) to the D-section (site D) is approximately 0.90 to 0.99.

Dimensions Upon Completion of Restoring Step (S5)

After the low-profile pressing step (S4), the electrode body 10 is left in an uncontrolled state so that the restoring step (S5) is executed. In the restoring step (S5), the length D of the bent portion R from the center C to the peripheral surface of the bent portion R in the longitudinal direction remains the same. On the other hand, the distance B'' from one peripheral surface of the flat portion F to the other peripheral surface in the thickness-wise direction T of the electrode body 10 is changed to the distance B' from one peripheral surface of the flat portion F to the other peripheral surface in the thickness-wise direction T of the electrode body 10. As a result, with regard to the thickness of the electrode body 10, the D/B ratio is equal to D/(B'/2), which is 1.01 to 1.10.

The framework of the separator 120 is substantially restored to the original dimensions by the rebound resilience in the restoring step (S5). Thus, the ratio of B' to (2×electrode body lamination thickness E) is 0.98 to 1.00.

In addition, in the low-profile pressing step (S4), the walls of the fine holes are compressed beyond the yield point, and the separator 120 is plastically deformed. Therefore, even after the electrode body 10 is left in an uncontrolled state in the restoring step (S5), after completion of the restoring step (S5), the air permeance ratio of the B-section (site B) to the D-section (site D) remains the same as immediately after the low-profile pressing step (S4). Thus, the air permeance [µm/(Pa·s)] of the site B does not change, and the air permeance ratio of the B-section (site B) to the D-section (site D) is 0.90 to 0.99.

Combined Resistance Rdc and Combined Resistance Rbc

The combined resistance Rdc and the combined resistance Rbc are obtained through, for example, the following process. Reaction resistance Rb1, which is caused by the inter-electrode distance in the site B, and reaction resistance Rd1, which is caused by the inter-electrode distance in the site D, are measured. Also, solution resistance Rd2, which is caused by the air permeance in the site D, and the solution resistance Rb2, which is caused by the air permeance in the site B, are measured. The combined resistance Rdc of the site D is obtained by adding the reaction resistance Rd1 and the solution resistance Rd2. The combined resistance Rbc of the site B is obtained by adding the reaction resistance Rb1 and the solution resistance Rb2. The combined resistance Rdc of the site D is compared with the combined resistance Rbc of the site B to obtain a difference between Rdc and Rbc. When the difference is less than a set threshold value, it is determined that the nonuniformity of the current density is within a range that limits deposition of lithium metal.

Measurement of Reaction Resistance and Solution Resistance

In the lithium-ion rechargeable battery 1, the reaction resistance and the solution resistance may be measured through an alternating current (AC) impedance method. The AC impedance method is a method that applies voltage to the electrode system of a rechargeable battery as a frequency with very small amplitude is changed in a stepped manner to observe impedance spectrum.

The lithium-ion rechargeable battery 1 is expressed as an equivalent circuit. More specifically, the lithium-ion rechargeable battery 1 is expressed as the solution resistance and a parallel circuit of a charge transfer resistance and the reaction resistance of an electrical double layer connected in series to the solution resistance. The structure having a nonaqueous electrolyte between electrodes is considered as the electrical double layer and is used as a capacitor. The AC resistance of the electrical double layer is a resistance component corresponding to dielectric loss due to delay of polarization of a dielectric material in a low-frequency range, and is a resistance component corresponding to the skin effect and proximity effect of electrodes in a high-frequency range. This corresponds to the reaction resistance. As described above, impedance changes in accordance with frequency. Theoretically, when direct current (DC) voltage is applied, the electrical double layer does not conduct electricity. When AC voltage is applied, the resistance value becomes zero as the frequency of the AC voltage increases. Therefore, at a high frequency (e.g., 100 Hz or higher), the combined resistance of the circuit is equal to the solution resistance. As the frequency increases (100 mHz to 100 Hz), the combined resistance includes the charge transfer resistance and the electrical double layer in addition to the solution resistance. At a low frequency (lower than 100 mHz), the combined resistance of the circuit is the sum of the solution resistance and the charge transfer resistance.

Although not explained, with the AC impedance method, the reaction resistances Rb1 and Rd1, which are caused by the inter-electrode distance, and the solution resistances Rd2 and Rb2, which are caused by air permeance, are obtained from Nyquist plots (not shown) with a horizontal axis of real numbers and a vertical axis of imaginary numbers.

Using Nyquist plots, the properties of the rechargeable battery such as response speed of the electrodes, electrical conductivity of the electrolyte, and capacitance of the electrical double layer are measured from impedance and a phase difference. The Nyquist plot has an imaginary value $Zimg[\Omega]$ of resistance on the vertical axis and $Zreal[\Omega]$ on the horizontal axis. As the frequency with very small amplitude is changed from a high frequency in a stepped manner, AC voltage is applied to the electrode system of the rechargeable battery 1. As a result, a zero cross Px is located at a position shifted rightward from the lower left origin Po along the horizontal axis, and a graph extends upward from the zero cross Px and is shaped as an arc having its center on the horizontal axis. Then, the graph linearly extends radially outward from an upper right point. The solution resistance (electron transfer resistance) is expressed by the distance from the origin Po to the zero cross Px, that is, a real value $Zreal[\Omega]$ of resistance of the zero cross Px. With regard to the solution resistance (electron transfer resistance), the resistance is analyzed when electrons transfer in the electrolytic solution, the electrode poles, the collector plates, and the like at a high frequency of 100 Hz or higher.

With regard to the reaction resistance, at an intermediate frequency (from 0.1 Hz to 100 Hz), the reaction resistance Pct, that is, resistance when charge (ions) transfers, is analyzed from chemical reaction at the electrodes. The reaction resistance is expressed by a graph extending from the zero cross Px and shaped as an arc having its center on the horizontal axis. When the performance of the electrodes has lowered, the arc-shaped graph has a larger radius.

EXPERIMENTS OF PRESENT EMBODIMENT

The lithium-ion rechargeable battery 1 and the method for manufacturing the lithium-ion rechargeable battery 1 according to the present embodiment have configurations as described above. Experiments conducted on the present embodiment will now be described. First to third experiments were conducted basically in the method for manufacturing the lithium-ion rechargeable battery 1 described above with different settings of numerical values.

First Experiment: D/B Ratio and Li Deposition Inhibition

FIG. 9 is a table showing the results of the first experiment. FIG. 9 shows the results of measurement of Li deposition inhibition when the D/B ratio was changed from 1.00 to 1.11 while the air permeance ratio of the B-section (site B) to the D-section (site D) was fixed at 0.95, and the ratio of B'(B") to (2×electrode body lamination thickness E) was fixed at 0.99. The symbol "○" indicates a desirable level of Li deposition inhibition for a product. The symbol "x" indicates an undesirable level of Li deposition inhibition for a product.

As shown in FIG. 8, when the D/B ratio is 1.00, the inter-electrode distance of the flat portion F is equal to the inter-electrode distance of the bent portion R. That is, the reaction resistance Rb1, which is caused by the inter-electrode distance in the site B, is equal to the reaction resistance Rd1, which is caused by the inter-electrode distance in the site D. The air permeance of the separator 120 differs between the flat portion F and the bent portion R. That is, the solution resistance Rd2, which is caused by the air permeance in the site D, differs from the solution resistance Rb2, which is caused by the air permeance in the site B. Therefore, the difference between the combined resistance Rdc of the site D and the combined resistance Rbc of the site B results in nonuniformity of the current density between the negative electrode sheet 100 and the positive electrode sheet 110. This lessens the Li deposition inhibition.

When the D/B ratio is 1.01 to 1.10, the inter-electrode distance of the flat portion F differs from the inter-electrode distance of the bent portion R. That is, the reaction resistance Rb1, which is caused by the inter-electrode distance in the site B, differs from the reaction resistance Rd1, which is caused by the inter-electrode distance in the site D. The air permeance of the separator 120 also differs between the flat portion F and the bent portion R. That is, the solution resistance Rd2, which is caused by the air permeance in the site D, differs from the solution resistance Rb2, which is caused by the air permeance in the site B. In this range, the difference between the reaction resistance Rd1 and the reaction resistance Rb1 compensates for the difference between the solution resistance Rd2 and the solution resistance Rb2. Therefore, the difference between the combined resistance Rdc of the site D and the combined resistance Rbc of the site B is within an allowable range, and nonuniformity of the current density is not formed between the negative electrode sheet 100 and the positive electrode sheet 110. This improves the Li deposition inhibition.

When the D/B ratio is 1.11, the inter-electrode distance of the flat portion F differs from the inter-electrode distance of the bent portion R. That is, the reaction resistance Rb1, which is caused by the inter-electrode distance in the site B, differs from the reaction resistance Rd1, which is caused by the inter-electrode distance in the site D. The air permeance of the separator 120 also differs between the flat portion F and the bent portion R. That is, the solution resistance Rd2, which is caused by the air permeance in the site D, differs from the solution resistance Rb2, which is caused by the air permeance in the site B. In this range, the difference between the reaction resistance Rd1 and the reaction resistance Rb1 is too large to be compensated for the difference between the solution resistance Rd2 and the solution resistance Rb2. Therefore, the difference between the combined resistance Rdc of the site D and the combined resistance Rbc of the site B is outside the allowable range, and nonuniformity of the current density occurs between the negative electrode sheet 100 and the positive electrode sheet 110. This lessens the Li deposition inhibition.

Based on the results described above, the air permeance ratio of the B-section (site B) to the D-section (site D) is fixed at 0.95, and the ratio of B'(B") to (2×electrode body lamination thickness E) is fixed at 0.99. The D/B ratio was changed from 1.00 to 1.11. With this configuration, when the D/B ratio was 1.00, the Li deposition inhibition was lessened. When the D/B ratio was 1.01 to 1.10, the Li deposition inhibition was satisfactory. When the D/B ratio was 1.11, the Li deposition inhibition was again lessened.

Thus, the D/B ratio is appropriately set in accordance with the values of the air permeance ratio of the B-section (site B) to the D-section (site D) and the ratio of B'(B") to (2×electrode body lamination thickness E). Therefore, when the combined resistance Rdc of the site D and the combined resistance Rbc of the site B are in the allowable range, the Li deposition inhibition is improved.

Second Experiment: Air Permeance Ratio of B-Section to D-Section and Li Deposition Inhibition FIG. 10 is a table showing the results of the second experiment. FIG. 10 shows the results of measurement of Li deposition inhibition when the air permeance ratio of the B-section (site B) to the D-section (site D) was changed from 0.88 to 1.00 while the D/B ratio was fixed at 1.05, and the ratio of B'(B") to (2×electrode body lamination thickness E) was fixed at 0.99. The symbol "○" indicates a desirable level of Li deposition inhibition for a product. The symbol "x" indicates an undesirable level of Li deposition inhibition for a product.

In a case where the air permeance ratio of the B-section to the D-section is 0.88, the D/B ratio is fixed at 1.05 as a precondition. The inter-electrode distance of the D-section (bent portion R) is greater than the inter-electrode distance of the B-section (flat portion F). That is, the reaction resistance Rd1 of the D-section (bent portion R) is greater than the reaction resistance Rb1 of the B-section (flat portion F). When the air permeance ratio of the B-section to the D-section is 0.88, the solution resistance Rd2 of the D-section (bent portion R) is less than the solution resistance Rb2 of the B-section (flat portion F). In this configuration, the Li deposition inhibition was lessened. Therefore, when the air permeance ratio of the B-section to the D-section is 0.88, the difference between the solution resistance Rd2 and the solution resistance Rb2 is excessive as compared to the difference between the reaction resistance Rd1 and the reaction resistance Rb1. It is considered from the results that the Li deposition inhibition was lessened because the difference between the combined resistance Rdc of the site D and the combined resistance Rbc of the site B was outside the allowable range.

When the air permeance ratio of the B-section to the D-section is 0.90 to 0.99, the difference between the reaction resistance Rd1 and the reaction resistance Rb1 is balanced out by the difference between the solution resistance Rd2 and the solution resistance Rb2. It is considered from the results that the Li deposition inhibition was improved because the difference between the combined resistance Rdc of the site D and the combined resistance Rbc of the site B was within the allowable range.

When the air permeance ratio of the B-section to the D-section is 1.00, the solution resistance Rd2 is equal to the solution resistance Rb2. This fails to cancel out the difference between the reaction resistance Rd1 and the reaction resistance Rb1, which is a precondition. Thus, it is considered that the Li deposition inhibition was lessened because the difference between the combined resistance Rdc of the site D and the combined resistance Rbc of the site B was outside the allowable range.

Thus, the air permeance ratio of the B-section (site B) to the D-section (site D) is appropriately set in accordance with the values of the D/B ratio and the ratio of B'(B") to (2×electrode body lamination thickness E). Therefore, when the difference between the reaction resistance Rd1 and the reaction resistance Rb1 is balanced out by the difference between the solution resistance Rd2 and the solution resistance Rb2, the difference between the combined resistance Rdc of the site D and the combined resistance Rbc of the site B is within the allowable range, so that the Li deposition inhibition is improved.

Third Experiment: B'/2E Ratio and Li Deposition Inhibition

FIG. 11 is a table showing the results of the third experiment. FIG. 11 shows the results of measurement of the Li deposition inhibition when the ratio of B'(B") to (2×electrode body lamination thickness E) was changed from 0.97 to 1.01 while the D/B ratio was fixed at 1.05, and the air permeance ratio of the B-section (site B) to the D-section (site D) was fixed at 0.95. The symbol "○" indicates a desirable level of Li deposition inhibition for a product. The symbol "x" indicates an undesirable level of Li deposition inhibition for a product.

As shown in FIG. 11, when the B'/2E ratio is 0.97, even after completion of the restoring step (S5), the thickness of the separator 120 of the electrode body 10, which was compressed in the low-profile pressing step (S4), is not sufficiently restored. That is, as a result, the inter-electrode distance of the flat portion F remains decreased. As a result of the decreased inter-electrode distance, the reaction resistance Rb1 of the site B of the flat portion F is much less than the reaction resistance Rd1 of the site D of the bent portion R. The air permeance ratio of the B-section (site B) to the D-section (site D) is fixed at 0.95. Thus, the solution resistance Rb2 of the B-section (site B) is greater than the solution resistance Rd2 of the D-section (site D). In this configuration, the comparison shows that the difference between the reaction resistance Rd1 and the reaction resistance Rb1 is greater than the difference between the solution resistance Rd2 and the solution resistance Rb2. Thus, the Li deposition inhibition was lessened because the difference between the combined resistance Rdc of the site D and the combined resistance Rbc of the site B was outside the allowable range.

When the B'/2E ratio is 0.98 to 1.00, after completion of the restoring step (S5), the thickness of the separator 120 of the electrode body 10, which was compressed in the low-profile pressing step (S4), is sufficiently restored. That is, as a result, the inter-electrode distance of the flat portion F is restored to the state prior to the low-profile pressing step (S4). As a result of the restored inter-electrode distance, the reaction resistance Rb1 of the site B of the flat portion F is slightly less than the reaction resistance Rd1 of the site D of the bent portion R. The air permeance ratio of the B-section (site B) to the D-section (site D) is fixed at 0.95. Thus, the solution resistance Rb2 of the B-section (site B) is greater than the solution resistance Rd2 of the D-section (site D). In this configuration, the comparison shows that the difference between the reaction resistance Rd1 and the reaction resistance Rb1 is equilibrated with the difference between the solution resistance Rd2 and the solution resistance Rb2. Thus, the Li deposition inhibition was improved because the difference between the combined resistance Rdc of the site D and the combined resistance Rbc of the site B was within the allowable range.

When the B'/2E ratio is 1.01, after completion of the restoring step (S5), the thickness of the separator 120 of the electrode body 10, which was compressed in the low-profile pressing step (S4), is overly restored. That is, as a result, the inter-electrode distance of the flat portion F is greater than that prior to the low-profile pressing step (S4). As a result of the increased inter-electrode distance, the reaction resistance Rb1 of the site B of the flat portion F is greater than the reaction resistance Rd1 of the site D of the bent portion R. The air permeance ratio of the B-section (site B) to the D-section (site D) is fixed at 0.95. Thus, the solution resistance Rb2 of the B-section (site B) is greater than the solution resistance Rd2 of the D-section (site D). In this configuration, the comparison shows that the difference between the reaction resistance Rd1 and the reaction resistance Rb1 is less than the difference between the solution resistance Rd2 and the solution resistance Rb2. Thus, the Li deposition inhibition was lessened because the difference between the combined resistance Rdc of the site D and the combined resistance Rbc of the site B was increased and became outside the allowable range.

Thus, the ratio of B'(B") to (2×electrode body lamination thickness E) is appropriately set in accordance with the fixed D/B ratio and the fixed air permeance ratio of the B-section (site B) to the D-section (site D). Therefore, when the difference between the combined resistance Rdc of the site D and the combined resistance Rbc of the site B is in the allowable range, the Li deposition inhibition is improved.

Summary of First to Third Experiments

The first to third experiments show that the following conditions improve the Li deposition inhibition.

The range of the thickness of the site D/the thickness of the site B is set to be greater than or equal to 1.01 and less than or equal to 1.10. The range of the air permeance of the site D/the air permeance of the site B is set to be greater than or equal to 0.90 and less than or equal to 0.99. The range of the thickness-wise dimension B'/(2×electrode body lamination thickness E) is set to be greater than or equal to 0.98 and less than or equal to 1.00. The range of the thickness-wise dimension B'/the thickness-wise dimension B" is set to be greater than or equal to 0.88 and less than or equal to 0.98. With this setting, the lithium-ion rechargeable battery 1 of the present embodiment inhibits Li deposition in a satisfactory manner.

Operation of Present Embodiment

The lithium-ion rechargeable battery and the method for manufacturing the lithium-ion rechargeable battery according to the present embodiment have the following operations. The low-profile pressing step (S4) causes the flat portion F and the bent portions R to have different reaction resistances Rd1 and Rb1 due to the difference in the inter-electrode distance of the negative electrode sheet 100 and the positive electrode sheet 110 opposed to each other in the electrode body 10.

To cancel out the difference in the reaction resistance, the separator 120 is compressed to a predetermined dimension B" in the low-profile pressing step (S4), so that the air permeance is changed. The change in the air permeance changes the solution resistance. Thus, the flat portion F and the bent portions R have different solution resistances Rd2 and Rb2. The difference between the solution resistances Rd2 and Rb2 compensates for the difference between the reaction resistances Rd1 and Rb1, thereby cancelling out the difference between the combined resistances Rdc and Rbc. As a result, the difference in the current density between the flat portion F and the bent portions R caused by the difference between the combined resistances Rdc and Rbc is cancelled out. Accordingly, the deposition of lithium metal caused by a nonuniform current density is effectively limited.

Effects of Present Embodiment (1) According to the present embodiment, the lithium-ion rechargeable battery and the method for manufacturing the lithium-ion rechargeable battery limit deposition of lithium metal.

(2) Since the combined resistance of the flat portion F conforms to the combined resistance of the bent portion R, the deposition of lithium metal is effectively limited.

(3) The combined resistance of the flat portion F and the combined resistance of the bent portion R are analyzed by separating into the reaction resistance and the solution resistance, and the reaction resistance and the solution resistance are separately controlled. Thus, the combined resistance of the flat portion F accurately conforms to the combined resistance of the bent portion R.

(4) The reaction resistance and the solution resistance are measured through the AC impedance method and thus accurately determined.

(5) The solution resistance is controlled by adjusting the diameter of the holes in the separator 120. Thus, the solution resistance is adjusted to any value.

(6) The adjustment of the diameter of the holes in the separator 120 is controlled by the pressing force in the low-profile pressing step (S4).

(7) The adjustment of the diameter of the holes in the separator 120 in the low-profile pressing step (S4) is controlled based on the air permeance.

(8) The method for manufacturing the lithium-ion rechargeable battery according to the present embodiment can be used in general manufacturing processes with simple numerical value control. Thus, no special facility or process is required.

(9) In particular, no special processing or treatment is required in the manufacturing of the negative electrode sheet 100, the positive electrode sheet 110, and the separator 120 of the electrode body 10. Thus, a conventional negative electrode sheet 100, a conventional positive electrode sheet 110, and a conventional separator 120 can be used without any change.

(10) The method for manufacturing the lithium-ion rechargeable battery according to the present embodiment is properly used with simple numeral value control. Thus, the control is objectively executed without special skills.

(11) Therefore, the lithium-ion rechargeable battery 1 of high quality is manufactured without decreasing the manufacturing efficiency.

(12) In addition, no special material, special facility, and jigs are required. The method for manufacturing the lithium-ion rechargeable battery 1 of the present embodiment is used without additional costs.

MODIFIED EXAMPLES

The lithium-ion rechargeable battery 1 of the present embodiment is an example of a nonaqueous electrolyte rechargeable battery according to the present disclosure and is not limited to the flat lithium-ion rechargeable battery 1 for vehicle on-board use as shown in the drawings. The lithium-ion rechargeable battery 1 is not limited to one for vehicle on-board use.

The ranges of numerical values used in the description are preferred examples of the present embodiment. The present disclosure is not limited to these numerical values.

The first to third experiments were conducted on a typical conventional lithium-ion rechargeable battery. The results are widely applicable. However, the present disclosure is not limited to the results.

Since the surfaces of the flat portion F are substantially flat, the site B, where the thickness of the flat portion F is measured, is defined as a site extending from the straight line connecting the centers C of the two bent portions R to the peripheral surface of the flat portion F in the thickness-wise direction T upon completion of the restoring step (S5). However, since the flat portion F is generally flat, the thickness may be measured, for example, at a central part of the flat portion F. The measurement site is not limited as long as the measurement site is fixed so that changes in dimensions are objectively acknowledged.

In the embodiment, the reaction resistance and the solution resistance are measured through the AC impedance method. However, the method is not limited as long as the reaction resistance and the solution resistance are accurately measured.

The flowchart shown in FIG. 6 is an example. One skilled in the art may add, remove, change, and reorder the steps in the flowchart and execute the steps.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing a nonaqueous electrolyte rechargeable battery that includes an electrode body, a nonaqueous electrolyte, and a rectangular box-shaped battery case accommodating the electrode body and the nonaqueous electrolyte, the method comprising:

laminating a positive electrode including a positive base and a positive composite material layer and a negative electrode including a negative base and a negative composite material layer with a porous resin separator disposed between the positive electrode and the negative electrode to form the electrode body, wherein the separator includes a framework and a three-dimensional mesh portion formed on the framework;

rolling the laminated electrode body about a roll axis;

low-profile pressing the electrode body, which was rolled in the rolling, from a direction orthogonal to the roll axis to form a planar flat portion F and two semicircular rod-shaped bent portions R on opposite ends of the flat portion F; and restoring the electrode body from elastic deformation occurred in the low-profile pressing; wherein when a direction parallel to the roll axis of the electrode body is referred to as a width-wise direction, a direction orthogonal to the roll axis of the electrode body and a surface of the flat portion F is referred to as a thickness-wise direction, a direction orthogonal to the width-wise direction and the thickness-wise direction is referred to as a longitudinal direction, a point located on a center axis of the semicircular rod-shaped bent portions R is referred to as a center C of the bent portions R, a site extending from the center C of each bent portion R to a peripheral surface of the bent portion R in the longitudinal direction upon completion of the restoring is referred to as a site D, the centers C of the two bent portion R are connected by a straight line, and a site extending from the straight line to a peripheral surface of the flat portion F in the thickness-wise direction upon completion of the restoring is referred to as a site B, a distance from one peripheral surface of the flat portion F to the other peripheral surface in the thickness-wise direction of the electrode body upon completion of the restoring is referred to as a thickness-wise dimension B', a lamination thickness of the electrode body upon completion of the rolling is referred to as an electrode body lamination thickness E, and a distance from one peripheral surface of the flat portion F to the other peripheral surface in the thickness-wise direction of the electrode body upon completion of the low-profile pressing is referred to as a thickness-wise dimension B", the three-dimensional mesh portion of the separator in the site B is plastically deformed by compressing the three-dimensional mesh portion of the separator in the site B beyond a yield point of the three-dimensional mesh portion through the low-profile pressing, and a pressing force of the low-profile pressing is adjusted such that:

a thickness of the site D/a thickness of the site B is greater than or equal to 1.01 and less than or equal to 1.10;

an air permeance of the site B/an air permeance of the site D is greater than or equal to 0.90 and less than or equal to 0.99;

the thickness-wise dimension B'/(2×the electrode body lamination thickness E) is greater than or equal to 0.98 and less than or equal to 1.00; and the thickness-wise dimension B"/the thickness-wise dimension B' is greater than or equal to 0.88 and less than or equal to 0.98.

2. The method according to claim 1, wherein the ranges of the thickness of the site D/the thickness of the site B, the air permeance of the site B/the air permeance of the site D, the thickness-wise dimension B'/(2×the electrode body lamination thickness E), and the thickness-wise dimension B"/the thickness-wise dimension B' are set so that a combined resistance Rdc of a reaction resistance Rd1 caused by an inter-electrode distance with a solution resistance Rd2 caused by the air permeance of the separator in the site D equals a combined resistance Rbc of a reaction resistance Rb1 caused by an inter-electrode distance with a solution resistance Rb2 caused by the air permeance of the separator in the site B.

3. The method according to claim 1, wherein the non-aqueous electrolyte rechargeable battery is a lithium-ion rechargeable battery.

* * * * *